D. G. MITCHELL.
TIRE PROTECTOR.
APPLICATION FILED SEPT. 6, 1913.
1,093,455.
Patented Apr. 14, 1914.
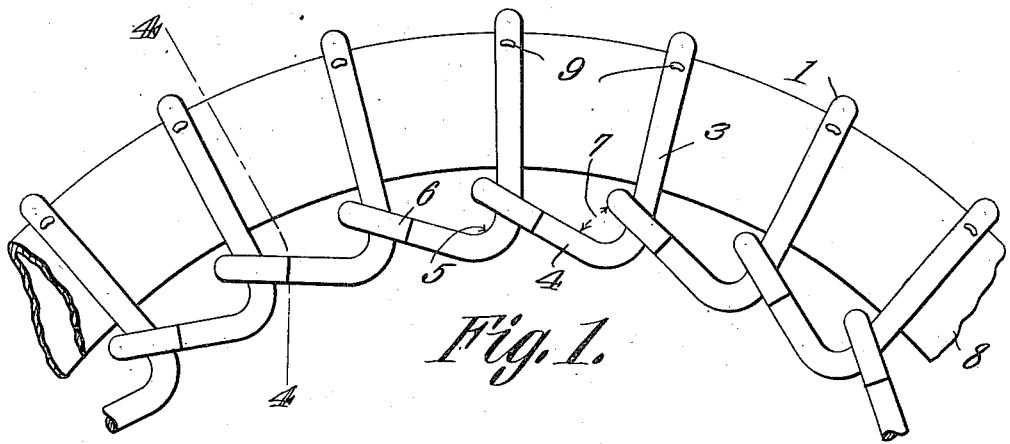
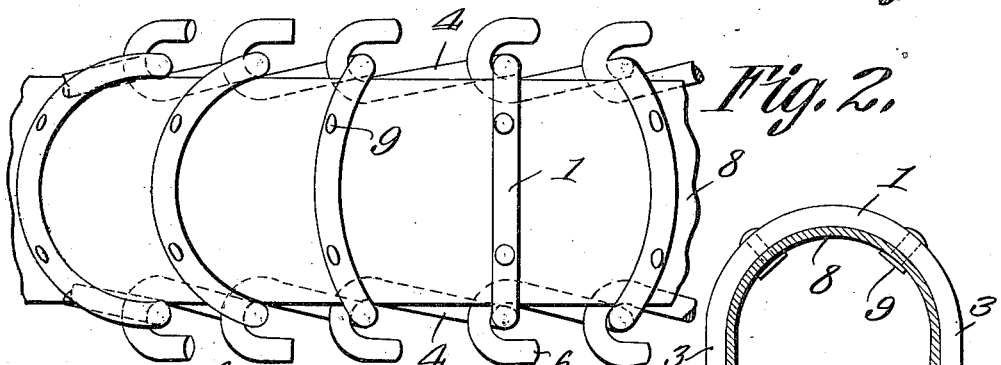
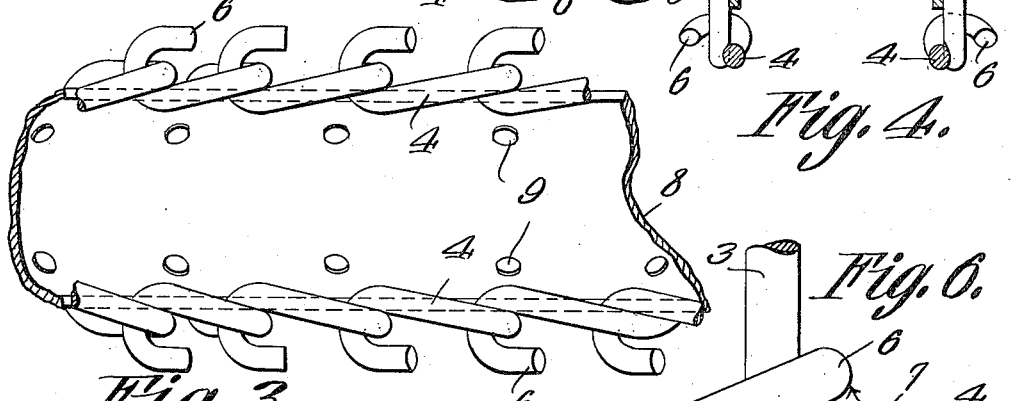
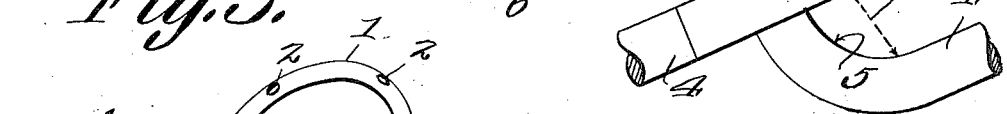
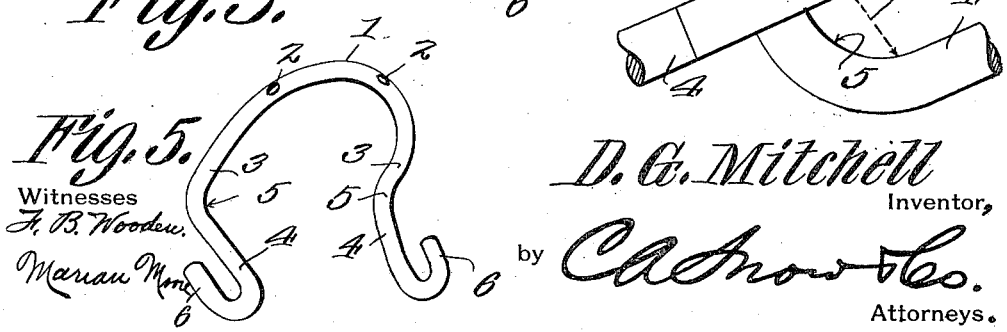
D. G. Mitchell, Inventor,
Witnesses

UNITED STATES PATENT OFFICE.

DAVID G. MITCHELL, OF OBERON, NORTH DAKOTA.

TIRE-PROTECTOR.

1,093,455. Specification of Letters Patent. Patented Apr. 14, 1914.

Application filed September 6, 1913. Serial No. 788,477.

*To all whom it may concern:*

Be it known that I, DAVID G. MITCHELL, a citizen of the United States, residing at Oberon, in the county of Benson and State of North Dakota, have invented a new and useful Tire-Protector, of which the following is a specification.

The device forming the subject matter of this application is a protector, adapted to be placed about the tire of an automobile or other vehicle.

One object of the present invention is to provide a device of the type above indicated, the constituent parts of which may be assembled readily.

Another object of the invention is to provide a structure of the sort above mentioned, which will combine flexibility with a capacity to resist elongation.

The invention aims, further, to provide a tire protector, which, when flattened, will automatically tighten the shield portion of the device about the tire.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 shows, in side elevation, a portion of a tire protector constructed in accordance with the present invention; Fig. 2 is a top plan of the structure shown in Fig. 1; Fig. 3 is a bottom plan of the structure shown in Fig. 1; Fig. 4 is a transverse section taken along the line 4—4 Fig. 1; Fig. 5 is a perspective of one of the ribs which enter into the construction of the protector; Fig. 6 is a fragmental side elevation of a pair of interengaged ribs.

The tire protector forming the subject matter of this application comprises a plurality of arched ribs 1 preferably fashioned from metal and standing radially of the protector, or nearly so. The ribs 1 adjacent their crowns are equipped with openings 2, as disclosed in Fig. 5. The ribs 1 comprise arms 3 terminating in circumferentially extending fingers 4, the fingers 4 defining acute angles with the arms 3. The ribs 1 comprise curved portions 5 located at the juncture between the arms 3 and the fingers 4, as will be best understood when Fig. 6 is compared with Fig. 1. The fingers 4 at their extremities terminate in eyes 6 which may be in the form of open-mouthed hooks. The eyes or hooks 6, upon any one rib 1 are engaged around the arms 3 of the next adjoining rib. As indicated at 7, the eyes or hooks 6 of any one rib are spaced from the fingers 4 of the next adjoining rib.

The invention further includes a shield 8, shown in the present instance as located within the ribs 1, the shield 8 being connected with the ribs by means of rivets 9 which enter the openings 2; although any other suitable means may be provided for connecting the shield with the ribs. The shield preferably is fashioned from leather, rubber, textile material or the like, although, possibly, a flexible metal shield might be employed with advantage.

It will be obvious that when the structure herein disclosed is placed about a vehicle tire, the latter will be adequately protected by the shield 8 and the arched ribs 1, the ribs, further, acting as traction cleats.

The hooks or eyes 6 of any one rib may be interengaged readily with the arms 3 of any adjoining rib, without the use of tools, and the shield 8 may be mounted in place by inserting the rivets 9.

Especial attention is directed to Fig. 6 in connection with Fig. 1, the curve indicated at 5 and the space indicated at 7 being noted. When any portion of the protector is flattened down, due to contact with the ground, the eyes or hooks 6 tend to travel along the curved portions 5. In this manner, the flexible shield 8 is contracted longitudinally and is caused to grip the inclosed tire closely.

Having thus described the invention what is claimed is:—

A tire protector comprising a plurality of arched ribs, each comprising arms terminating in circumferentially extending fingers having eyes, the ribs having curved portions located at the juncture between the arms and the fingers, the eyes of each rib being engaged with the arms of an adjoining rib in spaced relation to the fingers and curved portions of said adjoining rib; and a flexible shield assembled with certain of the ribs, the eyes being adapted to ride upon said curved portions toward the fingers to effect a contraction of the shield when the same is compressed.

In testimony that I claim the foregoing as my own, I have hereto affixed my signature in the presence of two witnesses.

DAVID G. MITCHELL.

Witnesses:
MARTIN DUFFY,
MARTIN RETTERATH.

Copies of this patent may be obtained for five cents each, by addressing the "Commissioner of Patents, Washington, D. C."